Patented Nov. 25, 1930

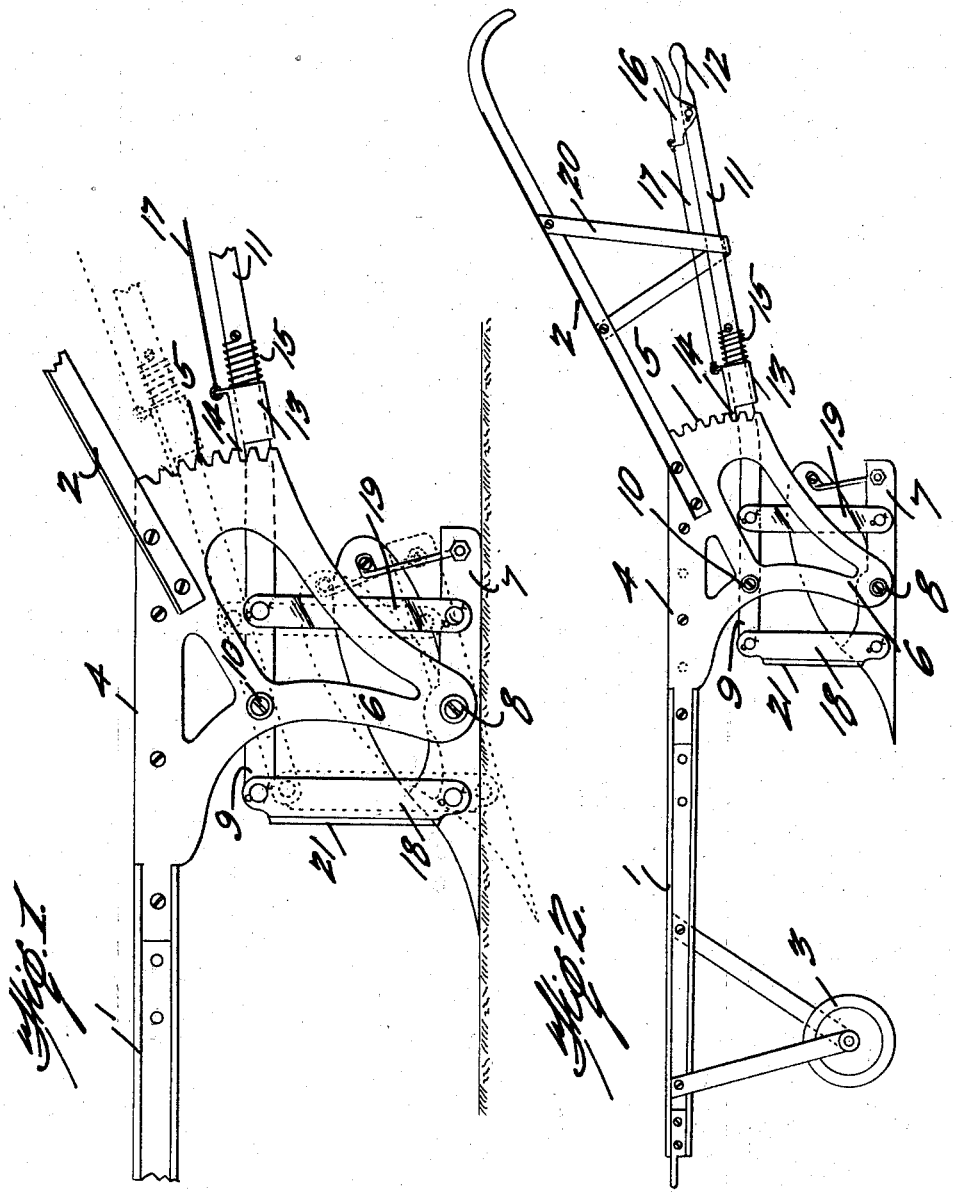

1,782,598

UNITED STATES PATENT OFFICE

CÉSAR BORDAS DE LA FÉ, OF HABANA, CUBA

PLOW

Application filed October 8, 1929. Serial No. 398,206.

This invention is directed to an improvement in plows and particularly to a means whereby the plowshare and moldboard may be selectively inclined with respect to the surface to graduate the introduction of the same into the soil to a depth determined by the required depth for the subsequent sowing.

The primary object of the present invention is to mount the moldboard and plowshare for pivotal connection with the plowbeam and provide manually controlled lever mechanism whereby the inclination of the plowshare and moldboard may be selectively determined.

The invention is illustrated in the accompanying drawings, in which:

Figure 1 is an enlarged broken side elevation illustrating the improved invention, the inclination of the moldboard and plowshare being indicated in dotted lines.

Figure 2 is a side elevation of the plow complete.

The improved plow includes a beam 1, handles 2 and a wheel 3 which may be of desired or conventional form. Carried by the rear end of the plowbeam 1 is a skeleton frame 4, the rear edge of which is formed to provide a series of teeth 5. The frame 4 includes a depending leg 6 to which a conventional moldboard and plowshare 7 is pivotally supported at 8.

An operating lever 9 is pivotally supported on the frame 4 at 10, the pivot 10 being in substantially vertical alignment with the pivot 8. The lever 9 extends forwardly and rearwardly of the pivot 10, the rear portion being sufficiently extended to provide a handle 11, the handle grip 12 of which is below the plow handles 2.

Slidably mounted on the extended portion 11 of the lever 9 is a slide 13 having a tooth 14 which will selectively cooperate with any of the teeth 5 of the frame 4. A spring 15 normally holds the slide in teeth engaging position, a finger lever 16 mounted adjacent the grip 12 of the lever 9 being connected by a rod or wire 17 with the slide 13 to withdraw the slide from engagement with the teeth 5 at will.

Links 18 and 19 connect the lever 9 on opposite sides of and at equi-distant points from the pivot 10 with the plowshare 7, the connection of the links to the plowshare being on opposite sides of and at substantially equi-distant points from the pivot 8.

Obviously, movement of the lever 9 in one direction or the other on its pivot 10 correspondingly moves the plowshare from the horizontal position indicated in full lines in Figure 1 to a position inclined with respect to the horizontal, one such position being indicated in dotted lines in Figure 1. As the slide 13 may interlock with any of the teeth 5 of the frame, it is apparent that the plowshare and moldboard may be moved to and secured in a plurality of differently inclined positions at will, and that the position of such share or moldboard can be readily and conveniently changed when desired by simple manipulation of the lever 9 in an obvious manner.

A hanger strap 20 depends from the handles 2 and serves as a stirrup for the lever 9, limiting the operative movement of the lever in one direction. The plowshare and moldboard may be thus changed in its cutting inclination and thus enter the surface to differently selected depths as may be determined by the character of the material to be later sowed.

If desired and as preferred, the link 18 may be formed on its forward edge as a cutting edge, as indicated at 21, this cutting edge serving to cut roots and the like as the plow advances.

What is claimed to be new is:

1. A plow including a beam, a frame secured thereto, a plowshare and moldboard unit pivotally mounted on the frame, a manually operable lever pivotally mounted on the frame, and links connecting the lever and said unit on opposite sides of the respective pivots, the forward link being sharpened to form a cutting edge.

2. A plow including a beam, a frame secured thereto, a plowshare and moldboard unit pivotally mounted on the frame, a manually operable lever pivotally mounted on the frame, links connecting the lever and said unit on opposite sides of the respective pivots, the front edge of the forward link being sharpened to form a cutting edge, said frame being formed with a plurality of teeth, and a manually controlled dog on the lever for co-operating with the teeth to lock the lever in a plurality of positions.

3. A plow including a standard, a plowshare and moldboard unit pivoted to the standard, an operating lever pivoted to the standard, said latter pivot being in vertical alignment with the pivot of said unit, and substantially parallel links pivoted to the lever and said unit on opposite sides of the pivots.

4. A plow including a beam, a frame secured thereto and provided at its rear end with teeth, a plowshare and moldboard unit pivotally mounted to the lower portion of the frame, a manually operable lever pivotally mounted on the frame, the pivots of said unit and lever being in vertical alignment, links pivoted to the lever and unit on opposite sides of the respective pivots, and means whereby the lever may be secured at a plurality of different positions with respect to the frame including a spring actuated dog on the lever cooperating with the teeth on the frame.

5. A plow including a beam, a frame secured thereto, a plowshare and moldboard unit pivotally mounted on the frame, a manually operable lever pivotally mounted on the frame, the pivots of said unit and lever being in vertical alignment, links connecting the lever and said unit on opposite sides of the respective pivots, the front edge of the forward link being sharpened to form a cutting edge, said frame being formed with a plurality of teeth, and a manually controlled dog on the lever for cooperating with the teeth to lock the lever in a plurality of positions.

6. A plow including a beam, a frame secured thereto, a plowshare and moldboard unit pivotally mounted to the frame, a manually operable lever pivotally mounted on the frame, the pivots of said unit and lever being in vertical alignment and substantially parallel, links pivoted to the lever and said unit on opposite sides of the respective pivots.

In testimony whereof I affix my signature.

CÉSAR BORDAS DE LA FÉ. [L. S.]